(12) United States Patent
Kanou et al.

(10) Patent No.: US 10,325,171 B2
(45) Date of Patent: Jun. 18, 2019

(54) OBJECT DETECTION DEVICE, DRIVING ASSISTANCE DEVICE, OBJECT DETECTION METHOD, AND OBJECT DETECTION PROGRAM

(71) Applicant: HONDA MOTOR CO., LTD., Minato-ku, Tokyo (JP)

(72) Inventors: Tadahiko Kanou, Sakura (JP); Yuichi Nakanishi, Shioya-gun (JP)

(73) Assignee: Honda Motor Co., Ltd., Tokyo (JP)

(*) Notice: Subject to any disclaimer, the term of this patent is extended or adjusted under 35 U.S.C. 154(b) by 293 days.

(21) Appl. No.: 14/710,754

(22) Filed: May 13, 2015

(65) Prior Publication Data

US 2015/0329049 A1  Nov. 19, 2015

(30) Foreign Application Priority Data

May 19, 2014 (JP) ................................ 2014-103615

(51) Int. Cl.
| | | |
|---|---|---|
| *G06K 9/32* | (2006.01) | |
| *B60R 1/00* | (2006.01) | |
| *B60W 30/00* | (2006.01) | |
| *G06K 9/46* | (2006.01) | |

(Continued)

(52) U.S. Cl.
CPC ............. *G06K 9/3241* (2013.01); *B60R 1/00* (2013.01); *B60W 30/00* (2013.01); *G06K 9/00805* (2013.01); *G06K 9/4604* (2013.01); *B60R 2300/102* (2013.01); *G08G 1/16* (2013.01)

(58) Field of Classification Search
CPC .............................. B06R 1/00; G06K 9/00805
See application file for complete search history.

(56) References Cited

U.S. PATENT DOCUMENTS 5,487,116 A * 1/1996 Nakano ............. G06K 9/00798
382/104
6,792,147 B1 * 9/2004 Saka .................... G06K 9/3241
382/190

(Continued)

FOREIGN PATENT DOCUMENTS

| CN | 1836267 A | 9/2006 |
|---|---|---|
| CN | 1980322 A | 6/2007 |

(Continued)

OTHER PUBLICATIONS

Office Action and Search Report dated Aug. 12, 2016 corresponding to German Patent Application No. 102015208782.4.

(Continued)

*Primary Examiner* — Rowina J Cattungal
(74) *Attorney, Agent, or Firm* — Carrier Blackman & Associates, P.C.; Joseph P. Carrier; Jeffrey T. Gedeon

(57) ABSTRACT

An object detection device includes: an imaging unit configured to image the surroundings of a vehicle; a horizontal edge extraction unit configured to extract horizontal edges that are characteristic lines of approximately horizontal direction components in a search region of an image captured by the imaging unit; and a detection object recognition unit configured to recognize a detection object within a recognition region set on the basis of, among the horizontal edges extracted by the horizontal edge extraction unit, a specific horizontal edge satisfying a predetermined condition.

10 Claims, 11 Drawing Sheets

(51) Int. Cl.
*G06K 9/00* (2006.01)
*G08G 1/16* (2006.01)

(56) References Cited

U.S. PATENT DOCUMENTS

| | | | |
|---|---|---|---|
| 2005/0152580 A1* | 7/2005 | Furukawa | G06K 9/3241 382/103 |
| 2006/0256198 A1* | 11/2006 | Nishiuchi | G06K 9/00805 348/148 |
| 2007/0274566 A1* | 11/2007 | Fujimoto | G06K 9/00805 382/103 |
| 2011/0010094 A1 | 1/2011 | Simon | |

FOREIGN PATENT DOCUMENTS

| | | |
|---|---|---|
| CN | 101029824 A | 9/2007 |
| CN | 102906801 A | 1/2013 |
| DE | 19926559 A1 | 12/2000 |
| DE | 10324895 A1 | 12/2004 |
| DE | 102008011228 A1 | 8/2009 |
| JP | 2000-113201 A | 4/2000 |
| JP | 2001-134769 A | 5/2001 |
| JP | 2001-331788 A | 11/2001 |
| JP | 2008-003660 A | 1/2008 |
| JP | 2008-293504 A | 12/2008 |
| JP | 2008-299458 A | 12/2008 |
| JP | 2012-068935 A | 4/2012 |
| JP | 2013-109455 A | 6/2013 |
| JP | 2013-210942 A | 10/2013 |
| JP | 2013-235422 A | 11/2013 |
| JP | 2014-021510 A | 2/2014 |

OTHER PUBLICATIONS

Office Action issued in the corresponding Chinese Patent Application 201510247020.3 dated Jan. 13, 2017, with a partial English translation thereof.
Office Action, dated Mar. 14, 2017, issued over the corresponding Japanese Patent Application 2014-103615 and the English translation thereof.

* cited by examiner

OBJECT DETECTION DEVICE, DRIVING ASSISTANCE DEVICE, OBJECT DETECTION METHOD, AND OBJECT DETECTION PROGRAM

CROSS REFERENCE TO RELATED APPLICATIONS

Priority is claimed on Japanese Patent Application No. 2014-103615, filed May 19, 2014, the content of which is incorporated herein in its entirety by reference.

BACKGROUND

Field of the Invention

The present invention relates to an object detection device, a driving assistance device, an object detection method, and an object detection program.

Background Art

A system is known that detects a forward vehicle ahead of a vehicle and performs collision avoidance control by carrying out image processing of an image captured by an imaging device installed on the vehicle.

In this context, known is an object recognition device installed on a vehicle comprising: an object position identification device that identifies the position of a leading vehicle; an imaging device that images in front of the vehicle; a processing region setting device that sets a processing region on an image acquired by the imaging device based on the position of the identified leading vehicle and a predetermined size of the leading vehicle to be recognized; an edge extracting device that extracts an edge from the processing region based on the brightness values of the pixels contained in the processing region; an edge determination device that determines whether or not it represents the leading vehicle; and an object recognition device that recognizes the external shape of the leading vehicle (refer to Japanese Unexamined Patent Application, First Publication No. 2008-293504 for example).

SUMMARY

However, the conventional technique detects an object from a limited characteristic, namely an edge. Consequently, there are cases where objects other than the one to be detected, such as structures and road signs, are incorrectly detected. Furthermore, a determination of whether or not it is the object to be detected is performed with respect to all of the edges. Therefore, there are cases where the processing time became long. On the other hand, proposed is a technique in which a detection object template is prepared beforehand, and the object is detected by comparing the respective image regions of a captured image with the template, and determining the degree of matching between the two. However, likewise in this case, the processing time becomes long.

Aspects according to the present invention take into consideration such circumstances, with an object of providing an object detection device, a driving assistance device, an object detection method, and an object detection program that is able to improve the detection accuracy while shortening the processing time.

The present invention employs the following aspects in order to solve the above problem and to achieve the object.

(1) An object detection device according to an aspect of the present invention comprises: an imaging unit configured to image the surroundings of a vehicle; a horizontal edge extraction unit configured to extract horizontal edges that are characteristic lines of approximately horizontal direction components in a search region of an image captured by the imaging unit; and a detection object recognition unit configured to recognize a detection object within a recognition region set on the basis of, among the horizontal edges extracted by the horizontal edge extraction unit, a specific horizontal edge satisfying a predetermined condition.

(2) As another aspect of the present invention, in the object detection device according to (1), the predetermined condition may represent being positioned on a lowermost side among the horizontal edges extracted by the horizontal edge extraction unit.

(3) As another aspect of the present invention, in the object detection device according to (1) or (2), the recognition region may be set such that a component on an upper side of the specific horizontal edge is larger than a component on a lower side of the specific horizontal edge.

(4) As another aspect of the present invention, the object detection device according to any one of (1) to (3) may be provided with a characteristic point extraction unit configured to extract characteristic points from an image captured by the imaging unit, and the detection object recognition unit may group a plurality of characteristic points extracted by the characteristic point extraction unit, and recognize the detection object within a recognition region set on the basis of, among the horizontal edges extracted by the horizontal edge extraction unit within a horizontal edge narrowing-down region set based on the grouped characteristic point group, a specific horizontal edge satisfying the predetermined condition.

(5) As another aspect of the invention, in the object detection device according to any one of (1) to (4), the detection object recognition unit may perform enlargement or reduction correction of the horizontal edge narrowing-down region, if the horizontal edge narrowing-down region differs from an estimated size of a detection object derived from its position in an image captured by the imaging unit.

(6) As another aspect of the invention, in the object detection device according to any one of (1) to (5), the detection object recognition unit may perform enlargement correction of the horizontal edge narrowing-down region toward a center direction of an image captured by the imaging unit, if the horizontal edge narrowing-down region is set such that it is biased to either the left or the right from a center line with respect to the horizontal direction of an image captured by the imaging unit.

(7) As another aspect of the invention, in the object detection device according to any one of (1) to (6), if the horizontal edge narrowing-down region is set such that it is biased to either the left or the right from a center line with respect to the horizontal direction of an image captured by the imaging unit, the detection object recognition unit may perform reduction correction of a larger of regions of the horizontal edge narrowing-down region when divided by the center line.

(8) As another aspect of the invention, in the object detection device according to any one of (1) to (7), if the horizontal edge narrowing-down region is set such that it is biased to either the left or the right from a center line with respect to the horizontal direction of an image captured by the imaging unit, the detection object recognition unit may perform enlargement correction of a smaller of regions of the horizontal edge narrowing-down region when divided by the center line.

(9) A driving assistance device according to an aspect of the present invention comprises; an object detection device according to any one aspect of (1) to (8), and a driving assistance unit configured to perform driving assistance of the vehicle based on a detection result of the object detection device.

(10) An aspect of the present invention is an object detection method comprising the steps of extracting horizontal edges that are characteristic lines of approximately horizontal direction components in a search region of an image captured by an imaging unit; and recognizing a detection object within a recognition region set on the basis of, among the extracted horizontal edges, a specific horizontal edge satisfying a predetermined condition.

(11) An aspect of the present invention is a computer-readable non-volatile recording medium provided with an object detection program that makes a control computer of an object detection device extract horizontal edges that are characteristic lines of approximately horizontal direction components in a search region of an image captured by an imaging unit, and recognize a detection object within a recognition region set on the basis of, among the extracted horizontal edges, a specific horizontal edge satisfying a predetermined condition.

Effects of the Invention

According to aspects (1), (10), and (11) mentioned above, horizontal edges that are characteristic lines of approximately horizontal direction components in a search region of an image captured by an imaging unit are extracted, and a detection object is recognized within a recognition region set on the basis of, among the extracted horizontal edges, a specific horizontal edge satisfying a predetermined condition. Therefore, it is possible to improve the detection accuracy while shortening the processing time.

According to aspect (2) mentioned above, by defining the predetermined condition as being positioned on the lowermost side among the horizontal edges extracted by the horizontal edge extraction unit, the recognition region is set on the basis of horizontal edges that have a tendency to clearly appear from the lower portion of the bumper, the shadow of the vehicle body, and the like. Therefore, the recognition region is more appropriately set.

According to aspect (3) mentioned above, the recognition region is set such that the component on the upper side of the specific horizontal edge is larger than the component on the lower side of the specific horizontal edge. Therefore, on the basis of horizontal edges that have a tendency to clearly appear from the lower portion of the bumper, from the shadow of the vehicle body, and the like, it is possible to set a region with a high probability of the vehicle body being present as the recognition region.

According to aspect (4) mentioned above, a characteristic point extraction unit is provided that extracts characteristic points from an image captured by an imaging unit, and a detection object recognition unit groups the plurality of characteristic points extracted by the characteristic point extraction unit, and recognizes a detection object within a recognition region set on the basis of among the horizontal edges extracted by the horizontal edge extraction unit within a horizontal edge narrowing-down region set based on the grouped characteristic point group, a specific horizontal edge satisfying a predetermined condition. Therefore, a region in which the detection object is realistically estimated to be present can be set as the recognition region.

According to aspects (5) to (8) mentioned above, by arbitrarily correcting the horizontal edge narrowing-down region set on the basis of characteristic points, the horizontal edge narrowing-down region can be set to a location on the image with a high probability of the detection object being present, and the specific horizontal edge can be extracted with a high accuracy.

According to aspect (9) mentioned above, it is possible to perform suitable driving assistance based on a target object that has been detected rapidly and with high accuracy by the object detection device.

DESCRIPTION OF THE EMBODIMENT

Hereunder, an embodiment of an object detection device, a driving assistance device, an object detection method, and an object detection program of the present invention is described with reference to the drawings.

Hereunder, an embodiment of a driving assistance device 1 containing an object detection device 5 according to an embodiment of the present invention is described.

Figure 1:
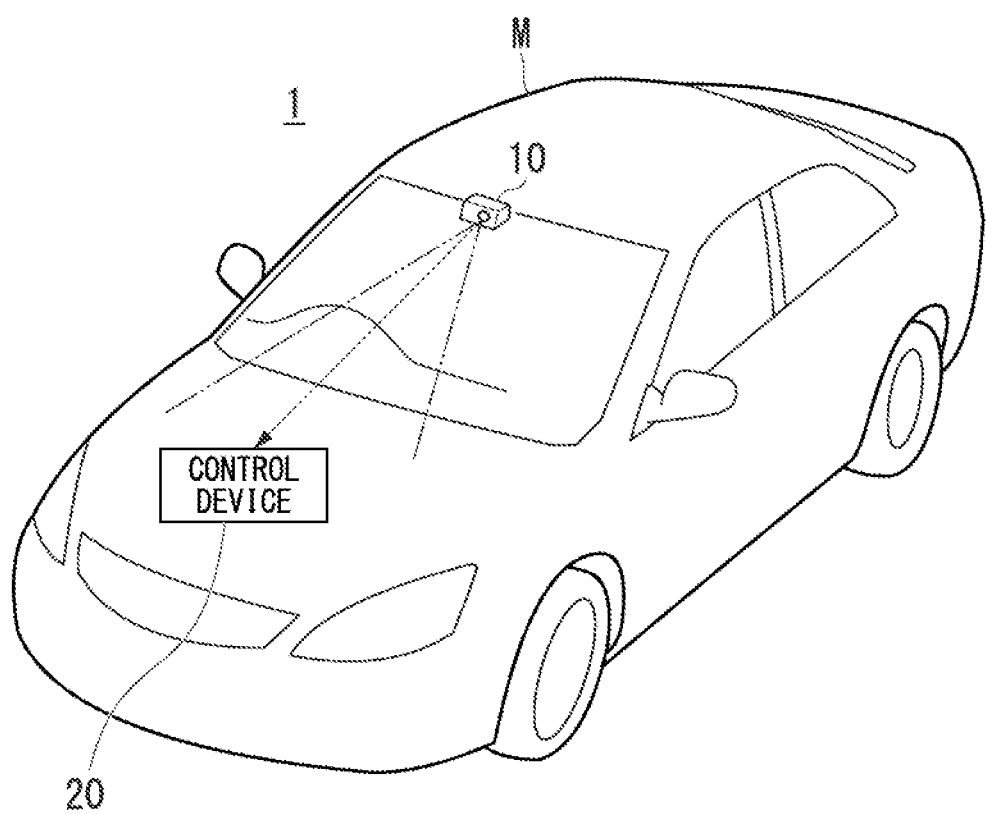
FIG. 1 is a drawing schematically showing an example of a configuration of a driving assistance device including an object detection device according to an embodiment.

FIG. 1 is a drawing schematically showing an example of a configuration of the driving assistance device 1 containing the object detection device 5 according to an embodiment of the present invention. The driving assistance device 1 is a device mounted on a vehicle M, and comprises a camera 10 and a control device 20 for example. Hereunder, the vehicle on which the object detection device 5 is mounted is referred to as the "driver's own vehicle". Furthermore, the vehicle traveling in front of the driver's own vehicle, and in the same direction as the driver's own vehicle, is referred to as the "forward vehicle".

The camera 10 is, for example, installed on an upper portion of the front windshield, the rear surface of the rear-view mirror, or the like, and is a digital camera utilizing a solid-state image sensing device such as a CCD (Charge Coupled Device) or a CMOS (Complementary Metal Oxide Semiconductor). The camera 10 repeatedly captures in front of the driver's own vehicle at a predetermined period, and outputs the image data of the captured image to a control device 20 for example. Furthermore, the camera 10 may be an infrared camera suitable for nighttime use.

The control device 20 is a computer device in which a processor, such as a CPU (Central Processing Unit), a storage device, such as a ROM (Read Only Memory), a RAM (Random Access Memory), a HDD (Hard Disk Drive), an EEPROM (Electrically Erasable Programmable Read-Only Memory), or flash memory, a communication interface for performing communication with other devices within the vehicle, and the like, are connected by an internal bus for example.

Figure 2:
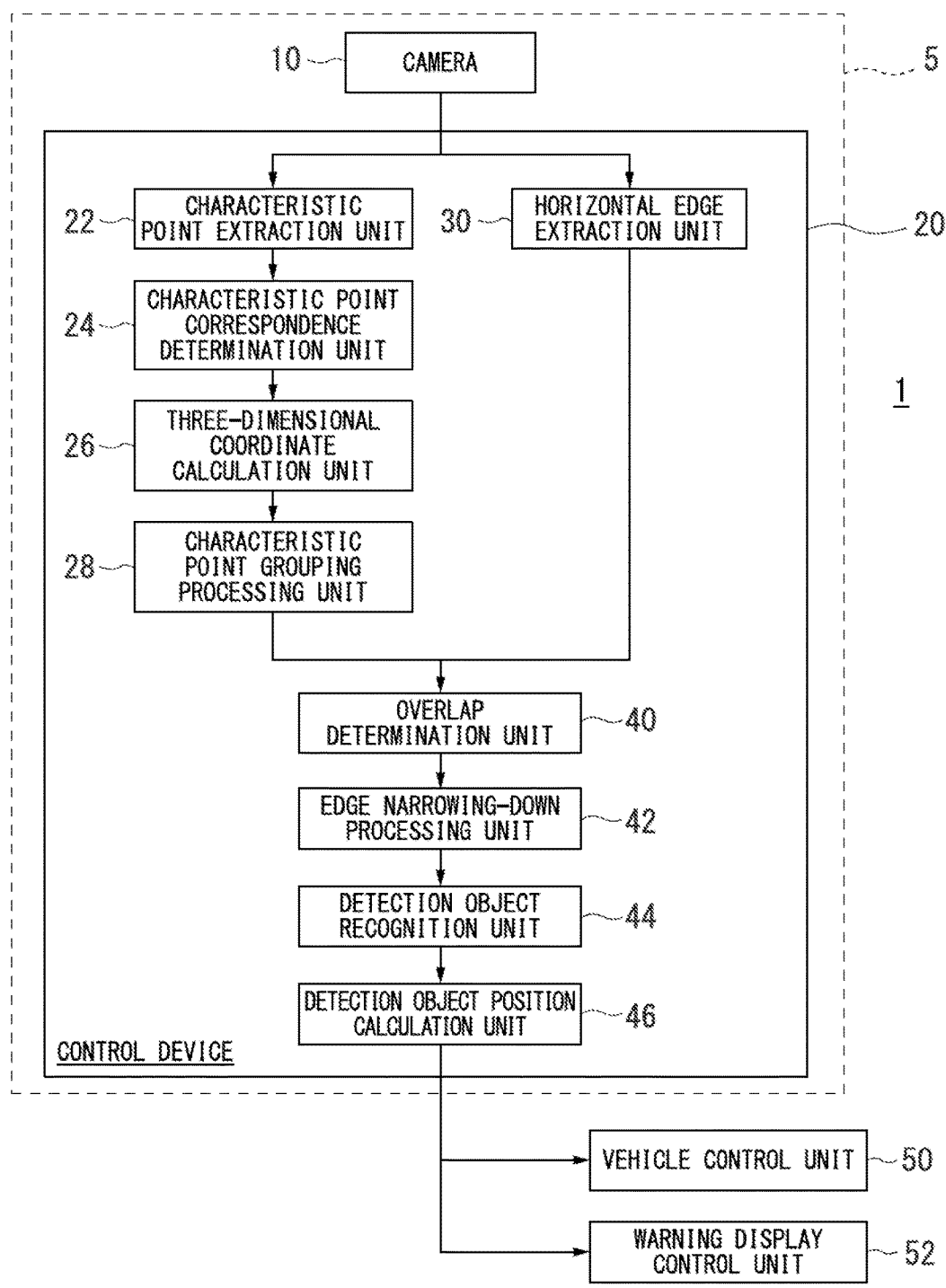
FIG. 2 is a drawing showing a function configuration example of a driving assistance device containing the object detection device.

FIG. 2 is a drawing showing a function configuration example of the driving assistance device 1 containing the object detection device 5. The control device 20 of the object detection device 5 comprises; a characteristic point extraction unit 22, a characteristic point correspondence determination unit 24, a three-dimensional coordinate calculation unit 26, a characteristic point grouping processing unit 28, a horizontal edge extraction unit 30, an overlap determination unit 40, an edge narrowing-down processing unit 42, a detection object recognition unit 44, and a detection object position calculation unit 46. These functional units are software functional units that function by means of a processor executing a program stored within a storage device for example. The program executed by the processor may be pre-stored in the storage device at the time of shipment of the driver's own vehicle. Furthermore, a program stored in a portable storage medium may be installed on the storage device of the control device 20. Moreover, the program may be downloaded from another computer device by means of an on-board internet service, and then installed on the storage device of the control device 20. A portion or all of the functional units mentioned above may be hardware functional units such as a LSI (Large Scale Integration) or an ASIC (Application Specific Integrated Circuit). Furthermore, the control device 20 is connected to a vehicle control unit 50 and a warning display control unit 52. The vehicle control unit 50 and the warning display control unit 52 may be separate functions of the same computer as the control device 20, or they may also be functions of a computer that is separate from the control device 20.

First, the horizontal edge extraction unit 30 is described. The horizontal edge extraction unit 30 extracts from an arbitrary search region in an image captured by the camera 10 (hereunder referred to as a "captured image"), horizontal edges that are characteristic lines that extend in an approximately horizontal direction. A horizontal edge is, for example, among lines that connect pixels having a brightness gradient greater than a predetermined value with respect to the adjacent pixels in the vertical direction, one in which the direction is an approximately horizontal direction (lateral direction in the image). The approximately horizontal direction is, for example, defined as an angle that lies within plus or minus 5 degrees with respect to the lateral direction of the image. Furthermore, the horizontal edges may, among lines that connect characteristic points extracted by the same method as the characteristic point extraction unit 22, be those in which the direction is an approximately horizontal direction.

The characteristic point extraction unit 22 extracts characteristic points from the captured image. A characteristic point is a pixel in which, for example, an average value for the brightness gradients with respect to the adjacent pixels in the vertical and horizontal directions is greater than a predetermined value. The method of extraction of the characteristic points can be a known method, such as a Harris operator or a SUSAN operator, or a new method may be appropriately used.

The characteristic point correspondence determination unit 24 determines the correspondence between the characteristic points extracted by the characteristic point extraction unit 22, from a plurality of captured images (between captured images representing two consecutive frames for example). The method of determining the correspondence between the characteristic points determines, with respect to the characteristic points that are moving between the images of the two consecutive frames, for which the displacement amount of the characteristic point between the captured images is larger than a predetermined value for example, and the other approximately stationary characteristic points of the target object, a correspondence of whether or not they respectively represent the same target object. A known method such as the KLT (Kanade Lucas Tomasi) tracking method, or a new method may be appropriately used.

The three-dimensional coordinate calculation unit 26 calculates three-dimensional coordinates for the characteristic points based on the correspondence of the characteristic points in the image over a plurality of frames. For example, the three-dimensional coordinates of the characteristic points can be acquired by SFM (Structure From Motion) which is a known technique, other known methods, or a new method can also be appropriately used.

The characteristic point grouping processing unit 28, from the three-dimensional coordinates of the characteristic points calculated by the three-dimensional coordinate calculation unit 26, groups the characteristic points that are deduced as being characteristic points of the same object. Then it sets a horizontal edge narrowing-down region that contains the grouped characteristic point group.

Figure 3:
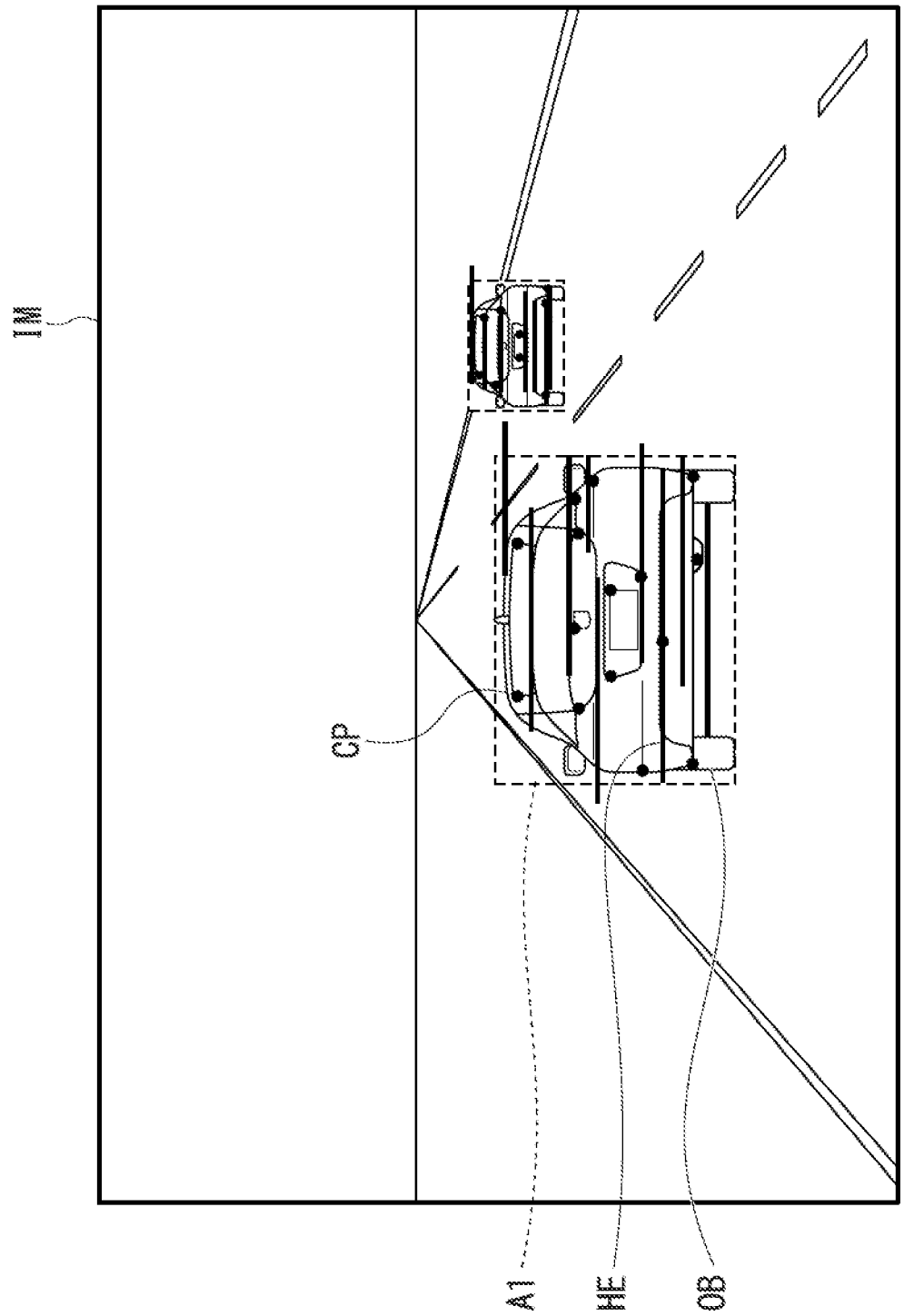
FIG. 3 is a drawing showing an aspect of a characteristic point grouping processing unit setting a horizontal edge narrowing-down region.

The horizontal edge narrowing-down region is a region set by the characteristic point grouping processing unit 28 for extracting, among the horizontal edges extracted by the horizontal edge extraction unit 30, a specific horizontal edge as described below. FIG. 3 is a drawing showing an aspect of the characteristic point grouping processing unit 28 grouping the characteristic points CP in the captured image IM that are deduced as being characteristic points of the same object, and setting a horizontal edge narrowing-down region A1 that includes the grouped characteristic point group. In the case of a captured image IM that has captured a detection object OB (forward vehicle), there is a tendency for the characteristic points CP to be extracted concentrated around the bumper, the number plate, the tail lights, and the like. The characteristic point grouping processing unit 28 groups the characteristic points extracted across a plurality of captured images IM that are deduced as being from the same object into a single group. Then, it sets the horizontal edge narrowing-down region A1 such that the grouped characteristic point group is contained. The characteristic point grouping processing unit 28 groups the characteristic points CP by clustering the characteristic points by their three-dimensional coordinates calculated by SFM for example. For example in the case of a forward vehicle, since it moves differently to a stationary object, the characteristic points CP that are deduced as being characteristic points of the forward vehicle can be extracted.

Here, the characteristic point grouping processing unit 28 sets the horizontal edge narrowing-down region A1 larger than a minimum rectangular region that contains the grouped characteristic point group. This is because there is a tendency for the characteristic points CP to be detected at the center portion of the forward vehicle, and there being a high probability of the minimum rectangular region containing the grouped characteristic point group not containing the entire forward vehicle.

The overlap determination unit 40 determines the level of overlap between the horizontal edges extracted by the horizontal edge extraction unit 30 and the horizontal edge narrowing-down region A1 set by the characteristic point grouping processing unit 28, and extracts the horizontal edges that overlap with the horizontal edge narrowing-down region A1. The overlap determination unit 40 may extract or exclude a horizontal edge HE that partially overlaps with the horizontal edge narrowing-down region A1.

In the present embodiment, the horizontal edge narrowing-down region A1 that is set on the basis of the characteristic points CP may be arbitrarily corrected. If the horizontal edge narrowing-down region A1 differs from the estimated size of the detection object OB derived from its position in the captured image IM, the overlap determination unit 40 performs enlargement or reduction correction of the horizontal edge narrowing-down region. For example, the overlap determination unit 40 performs enlargement or reduction correction of the horizontal edge narrowing-down region A1 based on the position of a representative point or edge, and the like, of the horizontal edge narrowing-down region A1 in the captured image IM. Furthermore, the overlap determination unit 40 may, based on the three-dimensional coordinates of the characteristic points calculated by the three-dimensional coordinate calculation unit 26, perform a correction with respect to the horizontal edge narrowing-down region A1 that is set by the characteristic point grouping processing unit 28 based on an offset amount. The overlap determination unit 40 calculates, based on the position of the representative point of the horizontal edge narrowing-down region A1 or the three-dimensional coordinates of the characteristic points calculated by the three-dimensional coordinate calculation unit 26, the distance between the object and the driver's own vehicle, calculates the offset amount to be larger the smaller the distance between the driver's own vehicle and the object. This is because the closer in position an object exists from the driver's own vehicle, the larger in size it becomes in the captured image IM. Then the overlap determination unit 40 performs enlargement or reduction correction of the horizontal edge narrowing-down region A1 by a size that corresponds to the offset amount. Consequently, the object detection device 5 is able to more accurately detect a forward vehicle. In the processing described below in FIGS. 5, 6, and 7, an offset amount may also be utilized to determine the amount of enlargement or reduction. Such a correction, rather than being performed after the horizontal edge narrowing-down region A1 is set by the characteristic point grouping processing unit 28, may also determine the size of the horizontal edge narrowing-down region A1 based on the position of a characteristic point group, and the like, that has been grouped in the captured image IM from the beginning.

Figure 4:
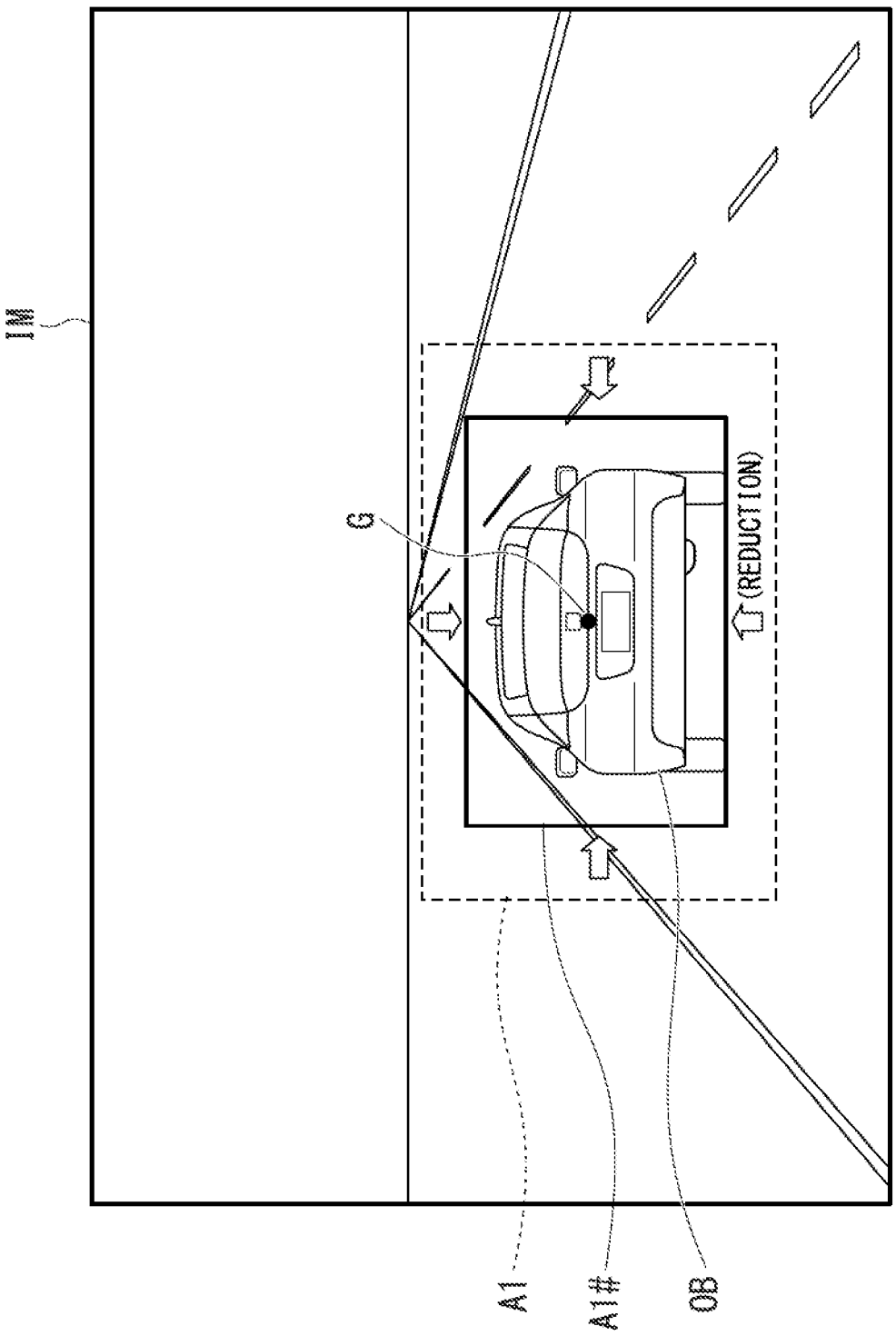
FIG. 4 is a drawing showing an aspect of an overlap determination unit performing reduction correction of the horizontal edge narrowing-down region.

Furthermore, the overlap determination unit 40 may, with the same purpose as the processing based on the offset amount mentioned above, perform processing such that the horizontal edge narrowing-down region A1 is reduced if the horizontal edge narrowing-down region A1 is large compared to the estimated size of the detection object OB derived from its position in the captured image IM. FIG. 4 is a drawing showing an aspect of the overlap determination unit 40 performing reduction correction of the horizontal edge narrowing-down region A1. As shown in the drawing, with respect to the captured image IM, the overlap determination unit 40 performs reduction correction if the horizontal edge narrowing-down region A1 is set larger than the estimated size of the detection object OB derived from the position of a representative point (for example, the centroid G, the four corners, the center points of the edges, and the like) of the horizontal edge narrowing-down region A1 in the captured image IM. The overlap determination unit 40 assumes that the centroid G of the detection object OB exists at the centroid G of the horizontal edge narrowing-down region A1, and derives a standard size on the image for the detection object OB (forward vehicle) if it is present at the position on the image thereof for example. The overlap determination unit 40 derives the standard size on the image mentioned above by referring to table data that specifies the relationship between the position of the centroid G and the size. Then the overlap determination unit 40 performs reduction correction of the derived standard image size to a region in which the centroid G is rendered on the image as the centroid. In the drawing. A1# represents the horizontal edge narrowing-down region after correction. The overlap determination unit 40 may perform enlargement correction of the horizontal edge narrowing-down region A1 if the horizontal edge narrowing-down region A1 is smaller than the estimated size of the detection object OB derived from its position in the captured image IM.

Figure 5:
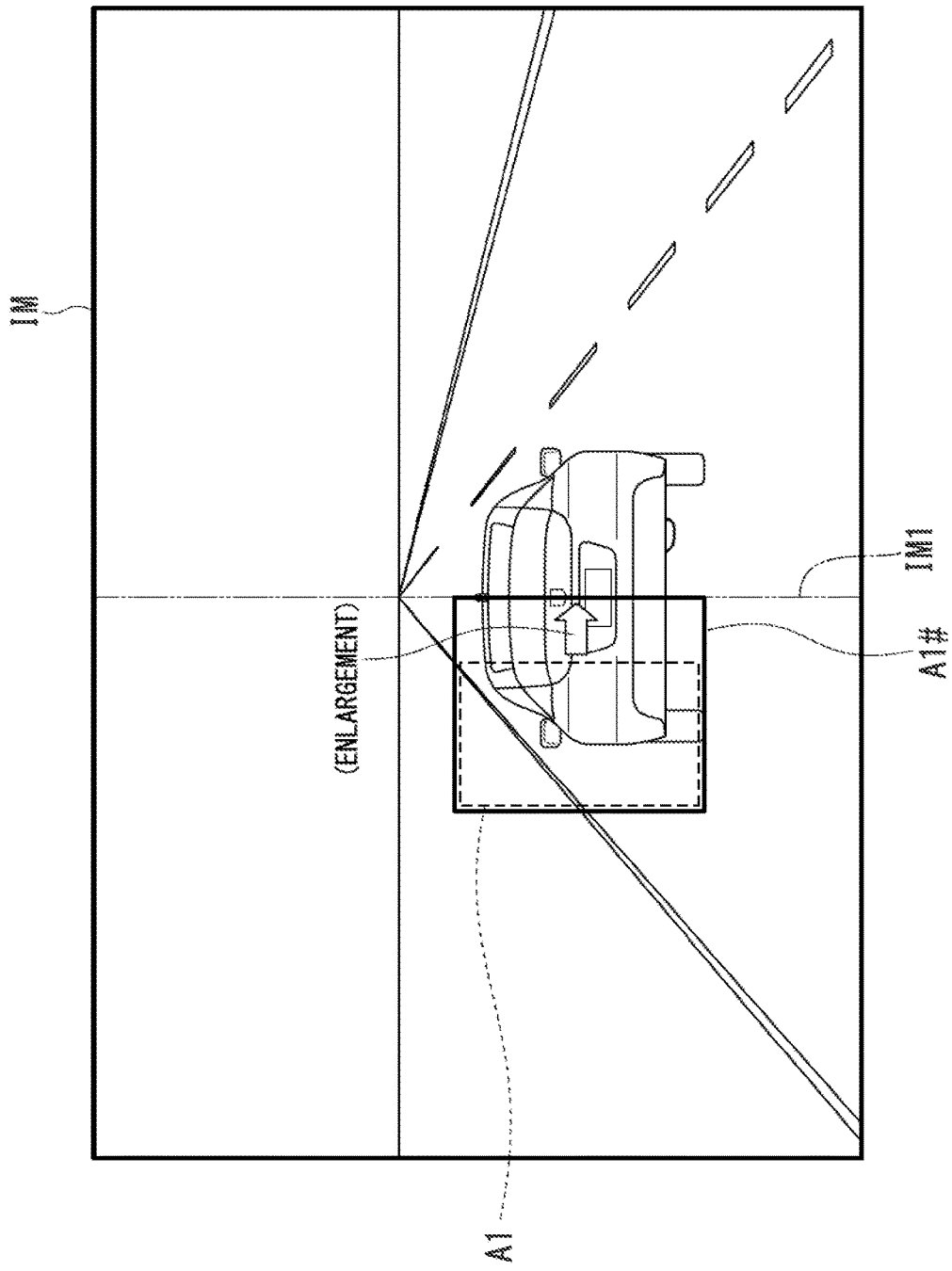
FIG. 5 is a drawing showing an aspect of the overlap determination unit performing enlargement correction of the horizontal edge narrowing-down region toward the center direction of a captured image.

Furthermore, if the horizontal edge narrowing-down region A1 is set such that it is biased to either the left or the right from the center portion with respect to the horizontal direction of the captured image IM, the overlap determination unit 40 may perform enlargement correction of the horizontal edge narrowing-down region A1 toward the center direction of the captured image IM. FIG. 5 is a drawing showing an aspect of the overlap determination unit 40 performing enlargement correction of the horizontal edge narrowing-down region A1 toward the center direction of the captured image IM. As shown in the drawing, if the horizontal edge narrowing-down region A1 is unevenly distributed to either the left or the right of a center line IM1 with respect to the horizontal direction of the captured image IM, the overlap determination unit 40 performs enlargement correction of the horizontal edge narrowing-down region A1 toward the center direction of the captured image IM. The amount by which enlargement correction is performed with respect to the horizontal edge narrowing-down region A1 toward the center portion of the captured image IM may be arbitrarily determined. However, it may be defined as an enlargement correction performed up to the center line IM1 for example.

Figure 6:
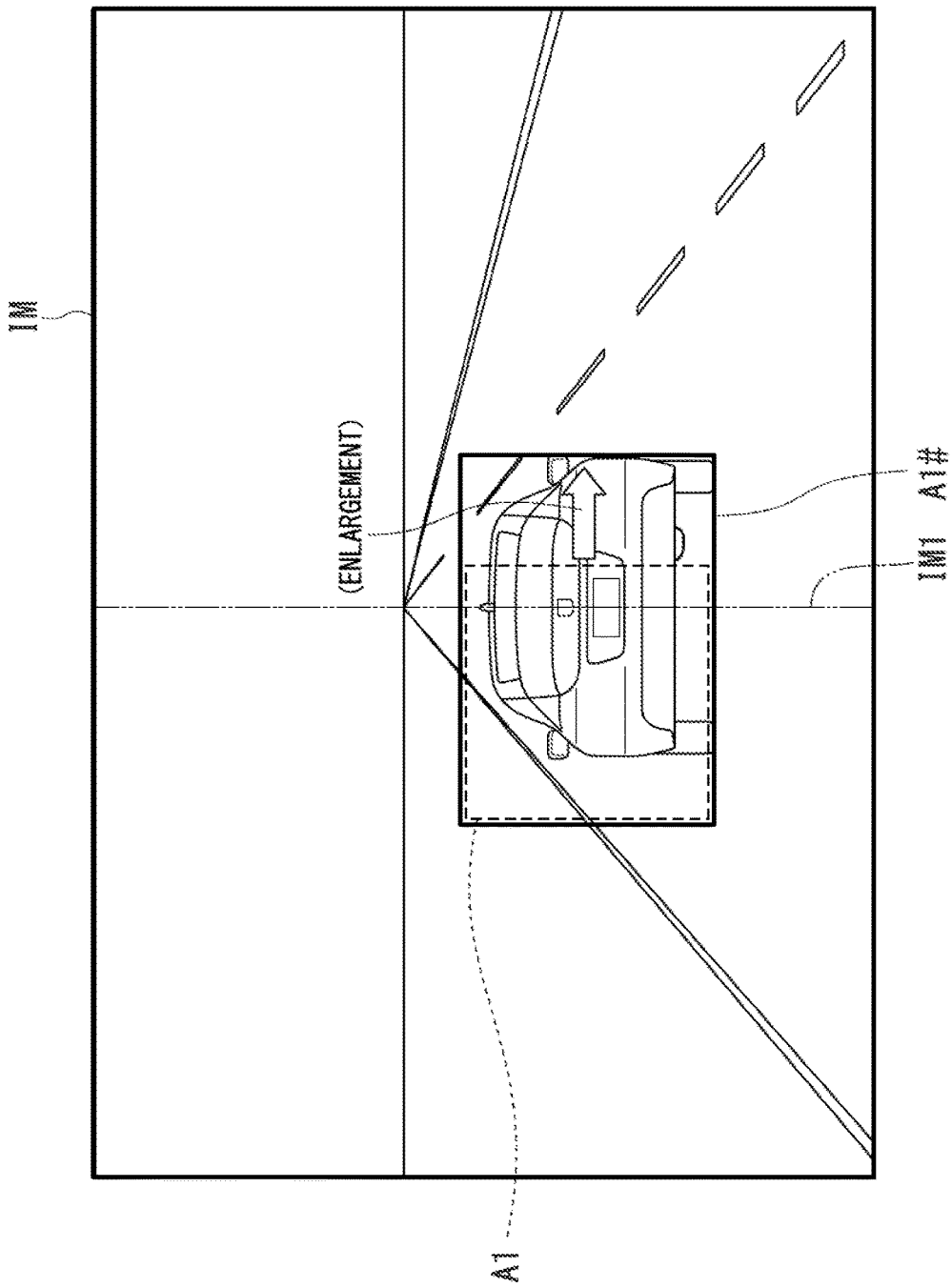
FIG. 6 is a drawing showing an aspect of the overlap determination unit performing enlargement correction of the smaller of the regions of the horizontal edge narrowing-down region when divided by the center line.

Furthermore, if the horizontal edge narrowing-down region A1 is set such that it is biased to either the left or the right from the center portion with respect to the horizontal direction of the captured image IM, the overlap determination unit 40 may perform enlargement correction of the smaller of the regions of the horizontal edge narrowing-down region A1 when divided by the center line IM1. FIG. 6 is a drawing showing an aspect of the overlap determination unit 40 performing enlargement correction of the smaller of the regions of the horizontal edge narrowing-down region A1 when divided by the center line IM1.

Figure 7:
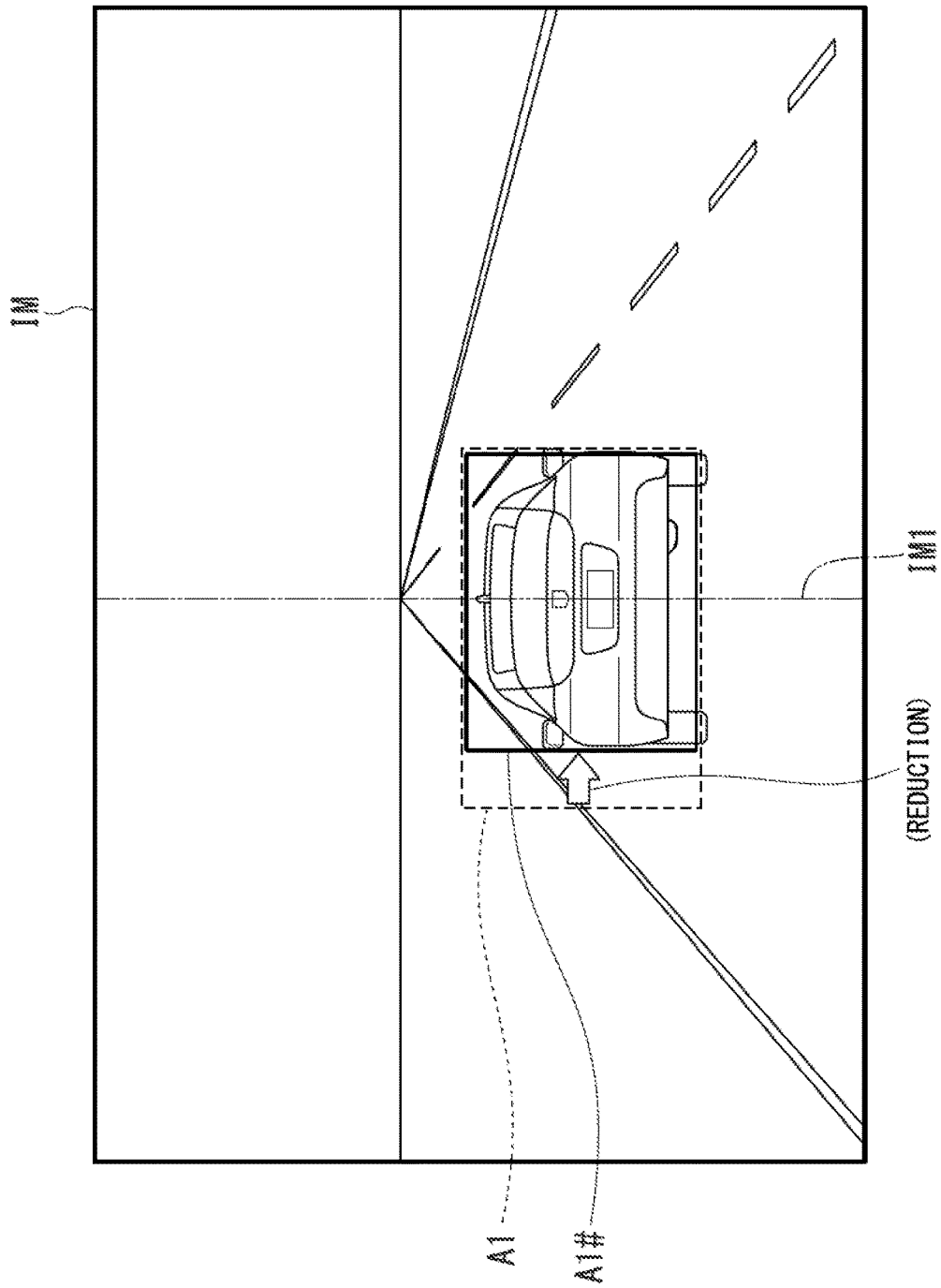
FIG. 7 is a drawing showing an aspect of the overlap determination unit performing reduction correction of the larger of the regions of the horizontal edge narrowing-down region when divided by the center line.

Moreover, in contrast to the processing shown in FIG. 6, if the horizontal edge narrowing-down region A1 is set such that it is biased to either the left or the right from the center portion with respect to the horizontal direction of the captured image IM, the overlap determination unit 40 may also perform reduction correction on the larger of the regions of the horizontal edge narrowing-down region A1 when divided by the center line IM1 with respect to the horizontal direction of the captured image IM. FIG. 7 is a drawing showing an aspect of the overlap determination unit 40 performing reduction correction of the larger of the regions of the horizontal edge narrowing-down region A1 when divided by the center line IM1. In each of the cases of FIG. 5 to 7, the horizontal edge narrowing-down region A1 is corrected such that it contains a region in the vicinity of the center portion of the captured image IM. As a result, the horizontal edge narrowing-down region A1 is set such that it includes a forward vehicle present in the traveling direction of the driver's own vehicle, which has the highest necessity for object recognition. Consequently, the object detection device 5 is able to more accurately detect a forward vehicle.

The edge narrowing-down processing unit 42 performs processing that narrows down the horizontal edges HE to a horizontal edge that satisfies a predetermined condition (specific horizontal edge). In the present embodiment, the predetermined condition represents being positioned on the lowermost side among the horizontal edges HE within the horizontal edge narrowing-down region A1 set by the characteristic point grouping processing unit 28. The specific horizontal edge may also be defined as a horizontal edge that exists at a position such as second or third from the bottom among the horizontal edges HE within the horizontal edge narrowing-down region A1. In the corresponding processing, the horizontal edges HE within the horizontal edge narrowing-down region A1 are considered as edges that have been extracted from the same object. Furthermore, it is based on a concept wherein, with respect to horizontal edges HE that have been extracted from the same object, it is sufficient for recognition processing to be performed on the basis of just a single edge and leaving only the most useful lower end horizontal edge HE, and the remaining horizontal edges HE (those having a height) may be excluded.

Figure 8:
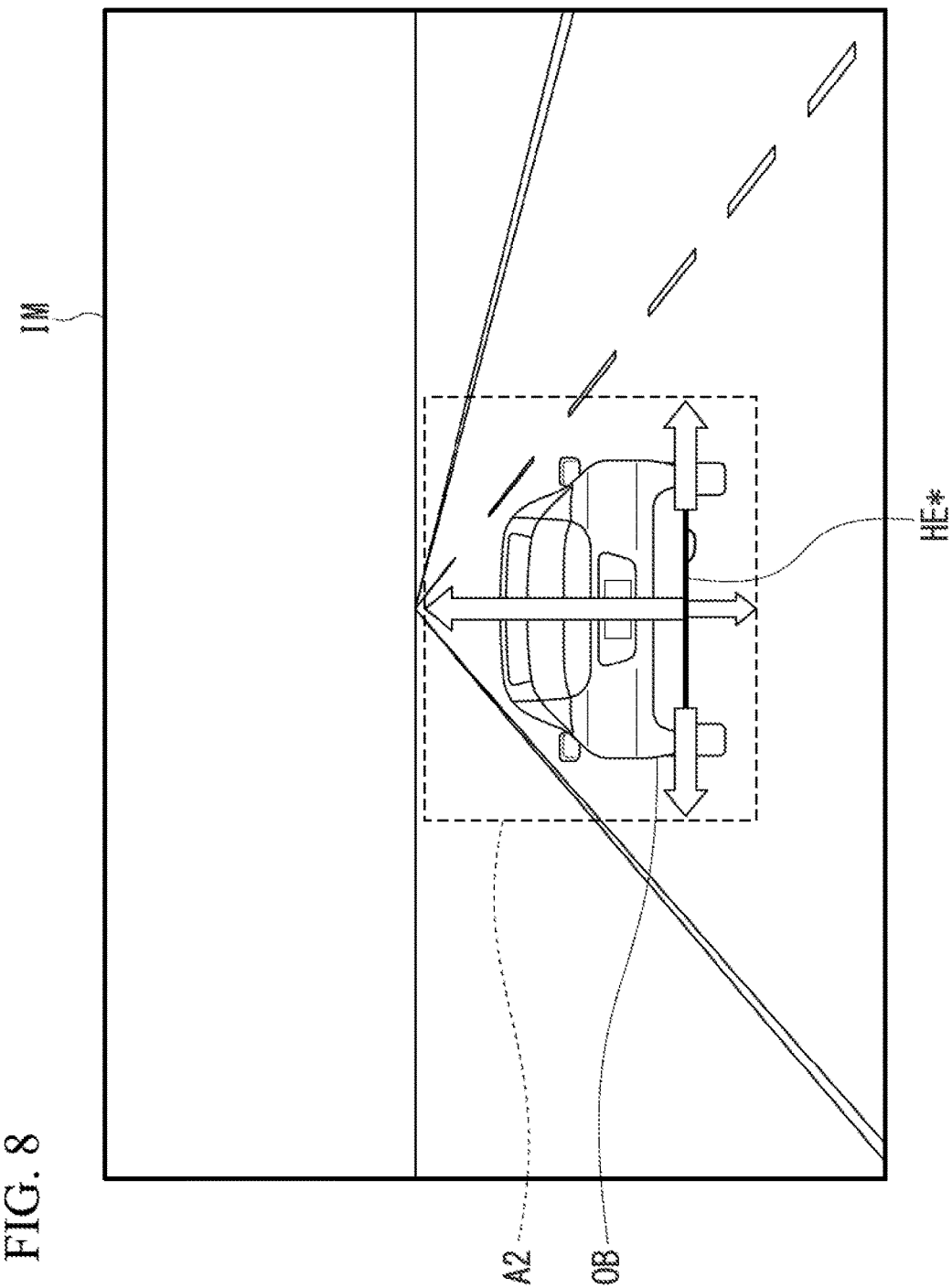
FIG. 8 is a drawing showing an aspect of a detection object recognition unit setting a recognition region.

The detection object recognition unit 44 sets a recognition region on the basis of the specific horizontal edge that has been narrowed down by means of the edge narrowing-down processing unit 42. FIG. 8 is a drawing showing an aspect of the detection object recognition unit 44 setting a recognition region A2. The detection object recognition unit 44 sets as the recognition region a region that has been expanded for example by 100 pixels on the upper side of the specific horizontal edge HE*, 20 pixels on the left side from the left edge of the specific horizontal edge HE*, 20 pixels on the right side from the right edge of the specific horizontal edge HE*, and 10 pixels on the lower side of the specific horizontal edge HE*. Furthermore, the detection object recognition unit 44 may change the size of the recognition region to be set based on the position of the specific horizontal edge HE* on the image. For example, if the specific horizontal edge HE* exists in the vicinity of the lower side of the captured image IM, it can be larger than that mentioned above. The recognition region may be set as a region that has been expanded for example by 150 pixels on the upper side of the specific horizontal edge HE*, 30 pixels on the left side from the left edge of the specific horizontal edge HE*, 30 pixels on the right side from the right edge of the specific horizontal edge HE*, and 15 pixels on the lower side of the specific horizontal edge HE*. In contrast, if the specific horizontal edge HE* exists in the vicinity of the upper side of the captured image IM, the recognition region may be set smaller than that mentioned above, as a region that has been expanded for example by 70 pixels on the upper side of the specific horizontal edge HE*, 14 pixels on the left side from the left edge of the specific horizontal edge HE*, 14 pixels on the right side from the right edge of the specific horizontal edge HE*, and 7 pixels on the lower side of the specific horizontal edge HE*. Then the detection object recognition unit 44 performs, for example, pattern matching (template matching) with respect to the characteristic point CP in the set recognition region A2, and carries out detection object recognition processing.

Here, it can be considered for the horizontal edge narrowing-down region A1 to be made the recognition region A2 without change. However, in this case, there is a tendency for the characteristic points CP to appear in the center portion of the forward vehicle. Therefore, it becomes difficult to set an accurate recognition region A2. Consequently, in the object detection device 5 of the present embodiment, by setting the recognition region A2 on the basis of the specific horizontal edge HE*, it becomes possible to perform accurate object recognition.

The detection object position calculation unit 46 determines the positional relationship between the characteristic points, which have a three-dimensional coordinate, and calculates the position (a distance and a lateral position) of the detection object. Furthermore, the detection object position calculation unit 46 calculates the speed of the detection object by means of the change in the position of the detection object in each frame of the captured image.

The vehicle control unit 50 performs various safety controls on the basis of the position of the detection object calculated by the detection object position calculation unit 46, such that the driver of the vehicle is able to drive safely. For example, it may perform speed control of the driver's own vehicle such that the following distance with the forward vehicle detected by the control device 20 is constantly maintained, or it may perform automatic braking control or automatic steering control of the driver's own vehicle based on the position of the detection object.

The warning display control unit 52 displays information indicating a caution or a warning alert to the vehicle interior on a display device, such as a liquid crystal display, based on the position of the detection object calculated by the detection object position calculation unit 46. Furthermore, the information indicating the caution or the warning alert may also be communicated to the driver by a fastening of the seatbelt, an alarm sound, a vibration, and the like.

[Operational Flow of Control Device 20]

Figure 9:
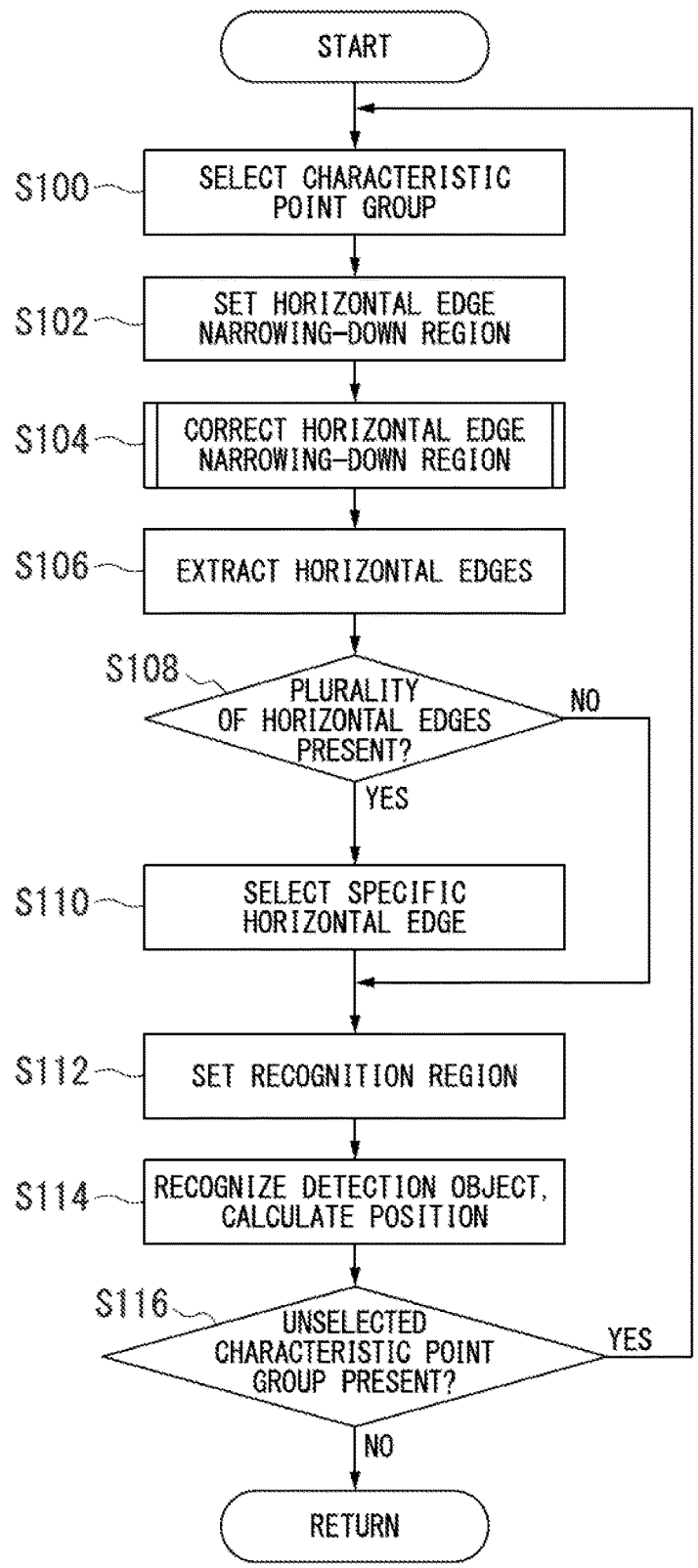
FIG. 9 is a flowchart showing an example of processing executed by a control device of the present embodiment.

FIG. 9 is a flowchart showing an example of processing executed by the control device 20 of the present embodiment. The present flowchart is repeatedly executed at a predetermined period for example. Firstly, the characteristic point grouping processing unit 28, from the three-dimensional coordinates of the characteristic points calculated by the three-dimensional coordinate calculation unit 26, groups the characteristic points that are deduced as being characteristic points of the same object (step S100). Then, it sets a horizontal edge narrowing-down region that contains the grouped characteristic point group (step S102).

Next, the overlap determination unit 40 performs correction of the horizontal edge narrowing-down region (step S104). The processing contents of step S104 are described below using FIGS. 10 and 11. Step S104 may also be omitted. Then, the horizontal edge extraction unit 30 extracts horizontal edges (step S106). Next, the edge narrowing-down processing unit 42 determines whether or not a plurality of horizontal edges exist in the horizontal edge narrowing-down region (step S108). If a plurality of horizontal edges exist in the horizontal edge narrowing-down region, the edge narrowing-down processing unit 42 selects a specific horizontal edge by narrowing down from the plurality of horizontal edges to a horizontal edge that satisfies a predetermined condition (step S110).

Then, the detection object recognition unit 44 sets a recognition region on the basis of the specific horizontal edge that has been narrowed down by means of the edge narrowing-down processing unit 42 (step S112). Further, the detection object recognition unit 44 performs detection object recognition processing with respect to the recognition region that has been set, and the detection object position calculation unit 46 determines the positional relationship between the characteristic points, which have a three-dimensional coordinate, and calculates the position of the detection object (step S114). This series of processes is also applied to the other characteristic point groups that have been grouped (step S116). Consequently, the processing of the present flowchart is completed.

[Operational Flow of Overlap Determination Unit 40 (Step S104)]

Figure 10:
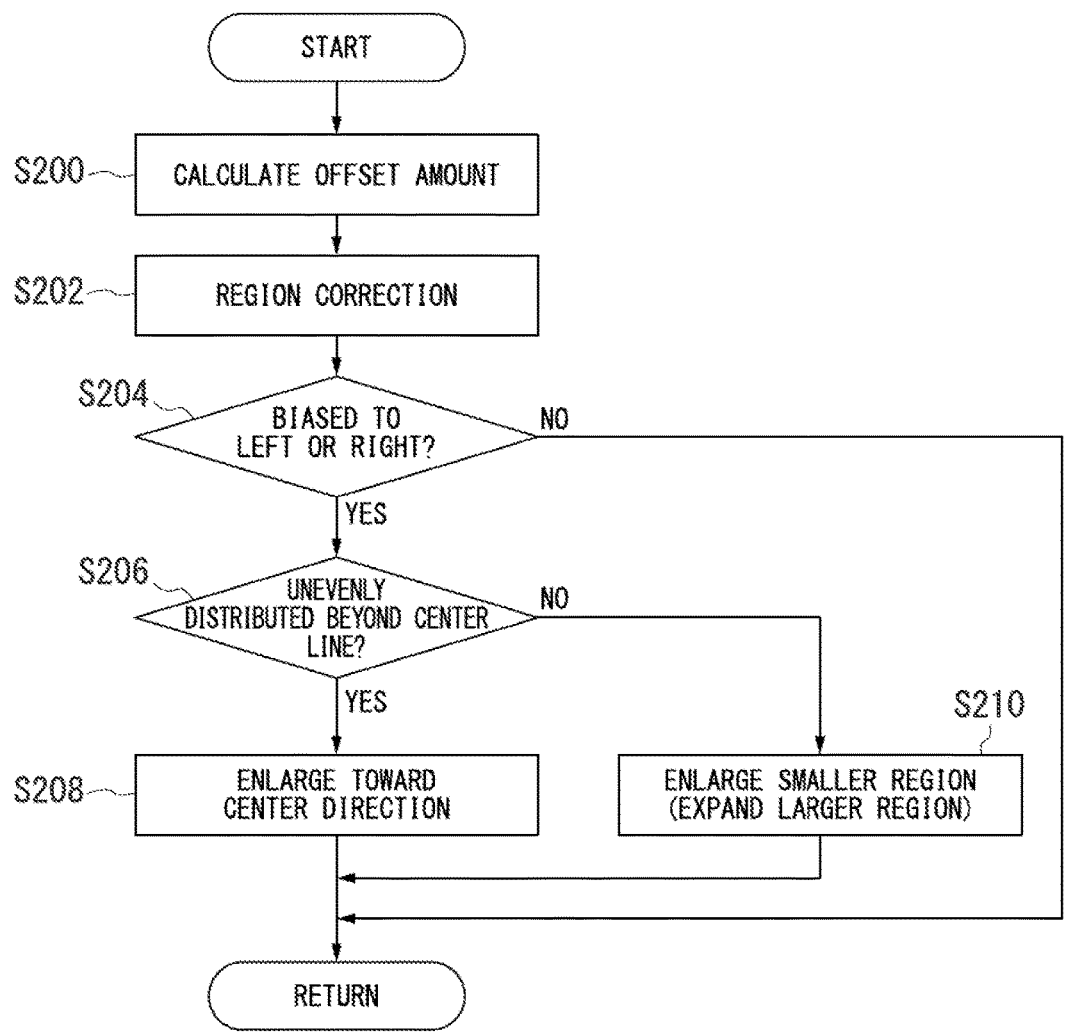
FIG. 10 is a flowchart showing an example of correction processing executed by an overlap determination unit of the present embodiment.

FIG. 10 is a flowchart showing an example of correction processing executed by the overlap determination unit 40 of the present embodiment. The processing of the present flowchart corresponds to the processing of step S104 in the flowchart of FIG. 9. Firstly, the overlap determination unit 40 calculates an offset amount with respect to the horizontal edge narrowing-down region A1 that has been set by the characteristic point grouping processing unit 28 (step S200). The overlap determination unit 40 corrects the horizontal edge narrowing-down region A1 based on the calculated offset amount (step S202).

Then, the overlap determination unit 40 determines whether or not the horizontal edge narrowing-down region A1 has been set such that it is biased to either the left or the right from the center portion with respect to the horizontal direction of the captured image IM (step S204). If it has not been set such that it is biased to either the left or the right from the center portion, a single routine of the present flowchart is completed. If the horizontal edge narrowing-down region A1 has been set such that it is biased to either the left or the right from the center portion with respect to the horizontal direction of the captured image IM, the overlap determination unit 40 determines whether or not the horizontal edge narrowing-down region A1 exists on only one side of the center line IM1 (step S206). If the horizontal edge narrowing-down region A1 exists on only one side of the center line IM1, the overlap determination unit 40 performs enlargement correction of the horizontal edge narrowing-down region A1 toward the center direction of the captured image IM (step S208). If the horizontal edge narrowing-down region A1 straddles both sides of the center line IM1, the overlap determination unit 40 performs enlargement correction of the smaller of the regions of the horizontal edge narrowing-down region A1 when divided by the center line IM1 (step S210). In place of step S210, the overlap determination unit 40 may also perform reduction correction of the larger of the regions of the horizontal edge narrowing-down region A1 when divided by the center line IM1.

Figure 11:
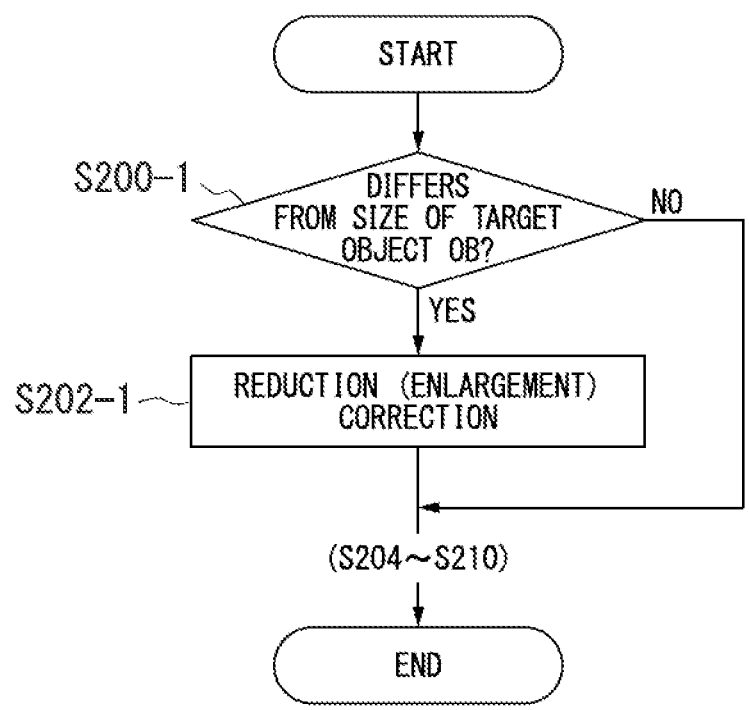
FIG. 11 is a flowchart showing another example of correction processing executed by the overlap determination unit of the present embodiment.

The overlap determination unit 40 may, in place of the processing of FIG. 10, perform the processing of FIG. 11. FIG. 11 is a flowchart showing another example of correction processing executed by the overlap determination unit 40 of the present embodiment. Firstly, the overlap determination unit 40 determines whether or not the size of the horizontal edge narrowing-down region A1 that has been set by the characteristic point grouping processing unit 28 differs from the estimated size of the detection object OB derived from its position in the captured image IM (step S200-1). Specifically, "differs from" may be defined as exceeding a tolerance set in the plus/minus directions with respect to the estimated size. If the size of the horizontal edge narrowing-down region A1 set by the characteristic point grouping processing unit 28 differs from the estimated size of the detection object OB derived from its position in the captured image IM, the overlap determination unit 40 performs reduction or enlargement correction of the horizontal edge narrowing-down region A1 (step S202-1). The processing thereafter is the same as that shown in FIG. 10, and the description is omitted.

According to the object detection device 5 of the embodiment described above, with respect to a search region of an image captured by an imaging unit 10, the horizontal edge extraction unit 30 extracts horizontal edges that are characteristic lines of approximately horizontal direction components, and the detection object recognition unit 44 recognizes a detection object by setting a recognition region on the basis of a specific horizontal edge that, among the horizontal edges extracted by the horizontal edge extraction unit, satisfies a predetermined condition. Therefore, improvements in detection rates and decreases in incorrect detection can be achieved without significantly increasing the processing time. That is to say, the detection accuracy can be improved while shortening the processing time.

Furthermore, according to the driving assistance device 1 of the present embodiment, as a result of the vehicle control unit 50 and the warning display control unit 52 performing driving assistance of the vehicle based on the calculation result of the detection object position calculation unit 46, and performing appropriate driving assistance such as carrying out speed control of the driver's own vehicle such that the following distance with the forward vehicle is constantly maintained, carrying out automatic braking control or automatic steering control of the driver's own vehicle based on the position of the detection object, or displaying information indicating a caution or a warning alert on a display device, such as a liquid crystal display, it becomes possible to contribute to safe driving.

The foregoing has described the mode for carrying out the invention by way of an embodiment. However, the present invention is in no way limited to such an embodiment, and various modifications and substitutions may be applied within a scope that does not depart from the gist of the present invention.

What is claimed is:

1. An object detection device comprising:
   a camera configured to image surroundings of a vehicle provided with the object detection device;
   a control device including a processor configured to operate as:
      a characteristic point extraction unit configured to extract characteristic points of another vehicle from an image captured by the camera;
      a characteristic point grouping processing unit configured to group the characteristic points extracted by the characteristic point extraction unit and set a horizontal edge narrowing-down region based on the grouped characteristic point group;
      a horizontal edge extraction unit configured to extract horizontal edges that are characteristic lines of approximately horizontal direction components in a search region of the image captured by the camera;

an overlap determination unit configured to extract the horizontal edges within the horizontal edge narrowing-down region; and a detection object recognition unit configured to specify a specific horizontal edge satisfying a predetermined condition among the extracted horizontal edges within the horizontal edge narrowing-down region, set a region where the specific horizontal edge is a positional reference and is expanded toward all of the left, right, up, and down directions in the image as a recognition region, and recognize a detection object within the recognition region, wherein the recognition region is set such that the specific horizontal edge is expanded by a first predetermined pixels toward the up direction, a left end of the specific horizontal edge is expanded by a second predetermined pixels toward the left direction, a right end of the specific horizontal edge is expanded by the second predetermined pixels toward the right direction, and the specific horizontal edge is expanded by a third predetermined pixels toward the down direction, wherein the first predetermined pixels, the second predetermined pixels, and the third predetermined pixels are set based on a position of the specific horizontal edge on the image, and wherein the horizontal edge narrowing-down region is set to be larger than a minimum rectangular region that contains the grouped characteristic point group.

2. The object detection device according to claim 1, wherein the predetermined condition represents being positioned on a lowermost side among the horizontal edges extracted by the horizontal edge extraction unit.

3. The object detection device according to claim 1, wherein the recognition region is set such that a component on an upper side of the specific horizontal edge is larger than a component on a lower side of the specific horizontal edge.

4. The object detection device according to claim 1, wherein the detection object recognition unit performs enlargement or reduction correction of the horizontal edge narrowing-down region, in the case that the horizontal edge narrowing-down region differs from an estimated size of a detection object derived from its position in the image captured by the camera.

5. The object detection device according to claim 1, wherein the detection object recognition unit performs enlargement correction of the horizontal edge narrowing-down region toward a center direction of the image captured by the camera, in the case that the horizontal edge narrowing-down region is set such that it is biased to either the left or the right from a center line with respect to the horizontal direction of the image captured by the camera.

6. The object detection device according to claim 1, wherein in the case that the horizontal edge narrowing-down region is set such that it is biased to either the left or the right from a center line with respect to the horizontal direction of the image captured by the camera, the detection object recognition unit performs reduction correction of a larger of regions of the horizontal edge narrowing-down region when divided by the center line.

7. The object detection device according to claim 1, wherein in the case that the horizontal edge narrowing-down region is set such that it is biased to either the left or the right from a center line with respect to the horizontal direction of the image captured by the camera, the detection object recognition unit performs enlargement correction of a smaller of regions of the horizontal edge narrowing-down region when divided by the center line.

8. A driving assistance device comprising;

an object detection device according to claim 1, and a driving assistance unit configured to perform driving assistance of the vehicle based on a detection result of the object detection device.

9. An object detection method comprising:

imaging surroundings of a vehicle with a camera;

extracting characteristic points of another vehicle from an image captured by the camera;

grouping the characteristic points into a characteristic point group and setting a horizontal edge narrowing-down region based on the characteristic point group;

extracting horizontal edges that are characteristic lines of approximately horizontal direction components in a search region of the image captured by the camera;

extracting the horizontal edges within the horizontal edge narrowing-down region;

specifying a specific horizontal edge satisfying a predetermined condition among the extracted horizontal edges within the horizontal edge narrowing-down region;

setting a region where the specific horizontal edge is a positional reference and is expanded toward all of the left, right, up, and down directions in the image as a recognition region; and recognizing a detection object within the recognition region, wherein the recognition region is set such that the specific horizontal edge is expanded by a first predetermined pixels toward the up direction, a left end of the specific horizontal edge is expanded by a second predetermined pixels toward the left direction, a right end of the specific horizontal edge is expanded by the second predetermined pixels toward the right direction, and the specific horizontal edge is expanded by a third predetermined pixels toward the down direction, wherein the first predetermined pixels, the second predetermined pixels, and the third predetermined pixels are set based on a position of the specific horizontal edge on the image, and wherein the horizontal edge narrowing-down region is set to be larger than a minimum rectangular region that contains the grouped characteristic point group.

10. An object detection system comprising:

a camera configured to image surroundings of a vehicle provided with the object detection device;

a control device including a processor and a non-transitory computer readable medium storing instructions for controlling the processor to operate as:

a characteristic point extraction unit configured to extract characteristic points of another vehicle from an image captured by the camera;

a characteristic point grouping processing unit configured to group the characteristic points extracted by the characteristic point extraction unit and set a horizontal edge narrowing-down region based on the grouped characteristic point group;

a horizontal edge extraction unit configured to extract horizontal edges that are characteristic lines of approximately horizontal direction components in a search region of the image captured by the camera;

an overlap determination unit configured to extract the horizontal edges within the horizontal edge narrowing-down region; and a detection object recognition unit configured to specify a specific horizontal edge satisfying a predetermined condition among the extracted horizontal edges within the horizontal edge narrowing-down region, set a region where the specific horizontal edge is a positional reference and is expanded toward all of the left, right, up, and down directions in the image as a recognition region, and recognize a detection object within the recognition region, wherein the recognition region is set such that the specific horizontal edge is expanded by a first predetermined pixels toward the up direction, a left end of the specific horizontal edge is expanded by a second predetermined pixels toward the left direction, a right end of the specific horizontal edge is expanded by the second predetermined pixels toward the right direction, and the specific horizontal edge is expanded by a third predetermined pixels toward the down direction, wherein the first predetermined pixels, the second predetermined pixels, and the third predetermined pixels are set based on a position of the specific horizontal edge on the image, and wherein the horizontal edge narrowing-down region is set to be larger than a minimum rectangular region that contains the grouped characteristic point group.

\* \* \* \* \*